United States Patent
Boutnaru (10) Patent No.: US 10,572,658 B2
(45) Date of Patent: Feb. 25, 2020

(54) IDENTIFYING COMPUTER BEHAVIOR USING VISUAL DATA ORGANIZATION AND GRAPHS

(71) Applicant: PAYPAL, INC., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 204 days.

(21) Appl. No.: 15/412,365

(22) Filed: Jan. 23, 2017

(65) Prior Publication Data

US 2018/0211037 A1   Jul. 26, 2018

(51) Int. Cl.
  *G06F 21/00*  (2013.01)
  *G06F 21/55*  (2013.01)
  *G06F 21/56*  (2013.01)

(52) U.S. Cl.
  CPC ............ *G06F 21/552* (2013.01); *G06F 21/56* (2013.01)

(58) Field of Classification Search
  CPC .............................. G06F 21/552; G06F 21/56
  See application file for complete search history.

(56) References Cited

U.S. PATENT DOCUMENTS

| | | | |
|---|---|---|---|
| 5,720,018 A * | 2/1998 | Muller | G06F 11/323 345/581 |
| 7,315,903 B1 | 1/2008 | Bowden | |
| 9,197,663 B1 * | 11/2015 | Gilbert | G06F 3/04817 |
| 9,542,177 B1 | 1/2017 | Johansson et al. | |
| 2005/0193376 A1 * | 9/2005 | Harrison | G06F 11/328 717/127 |
| 2005/0289071 A1 * | 12/2005 | Goin | G06F 11/008 705/56 |
| 2010/0058157 A1 * | 3/2010 | Kelly | G06F 11/0709 714/819 |
| 2013/0088596 A1 | 4/2013 | Raita et al. | |
| 2015/0261640 A1 * | 9/2015 | Cho | G06F 11/324 702/183 |
| 2018/0129581 A1 * | 5/2018 | Abadi | G06F 11/3608 |

OTHER PUBLICATIONS

Albright, Dann "JPEG, GIF, or PNG? Image Filetypes Explained and Tested" [Online] [retrieved on Dec. 30, 2016]. Retrieved from the Internet: <URL: http://www.makeuseof.com/tag/jpeg-gifpngimagefiletypesexplainedtested/>, Feb. 11, 2016.

* cited by examiner

*Primary Examiner* — Christopher C Harris
(74) *Attorney, Agent, or Firm* — Haynes and Boone, LLP (57) ABSTRACT

Configuration discrepancies, such as server drift among different servers or malicious code installed on one or more servers, can be identified using system attribute information regarding processes, CPU usage, memory usage, etc. The system attribute information can be used to generate an image, which can be compared to other images to determine if a configuration discrepancy exists. Image recognition algorithms can be used to facilitate image comparison for different systems. By identifying configuration discrepancies, downtime and other issues can be mitigated and system performance can be improved.

20 Claims, 5 Drawing Sheets

IDENTIFYING COMPUTER BEHAVIOR USING VISUAL DATA ORGANIZATION AND GRAPHS

TECHNICAL FIELD

This disclosure relates to computer networks and systems on computer networks. More particularly, this disclosure relates to various techniques that can be used for identifying and comparing behaviors of one or more computer systems relative to other computer systems and/or prior behaviors of those systems, which can be relevant to both computer security and computer monitoring.

In some instances, identification can be performed of a computer with a non-conforming configuration, which may be indicative of a computer with performance issues or possible malware.

DETAILED DESCRIPTION

In some embodiments, server drift among different servers in a cluster can be identified at an earlier stage than using other techniques. Server drift may cause different servers to behave in a different manner than expected (e.g. inconsistency across systems that in theory are identically or similarly configured). Identifying server drift early can prevent potentially costly downtime and production issues.

One technique for identifying server drift, or other configuration discrepancies in one or more systems, is to use system attribute information to generate an image for a system. This image can then be compared to other images (other systems, an average image for a cluster, a reference image corresponding to a fresh install, etc.) to determine if a configuration discrepancy exists. In some instances, facial recognition or other image comparison algorithms can be used to analyze differences. Further, images collected over time for a system can be animated into a movie, allowing a user to visually see how a system might be changing.

If a configuration discrepancy is identified (e.g. indicating server drift or malware), a variety of actions can be taken. An affected system can be re-imaged to a fresh configuration, potentially avoiding a service outage or other consequence. A server cluster helping to process electronic payment transactions, for example, can achieve higher performance if server drift is detected early, before an outage occurs. If a configuration discrepancy indicates potential malware, the system can be quarantined and/or investigated for a security breach.

Note that graph theory, in some instances, can also be used to analyze groups of computer systems such as a server pool, or processes running on a system or group of systems. This can allow inferences to be made regarding whether a particular system is infected with malware, running a particular service, or suffering from a configuration discrepancy, for instance This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
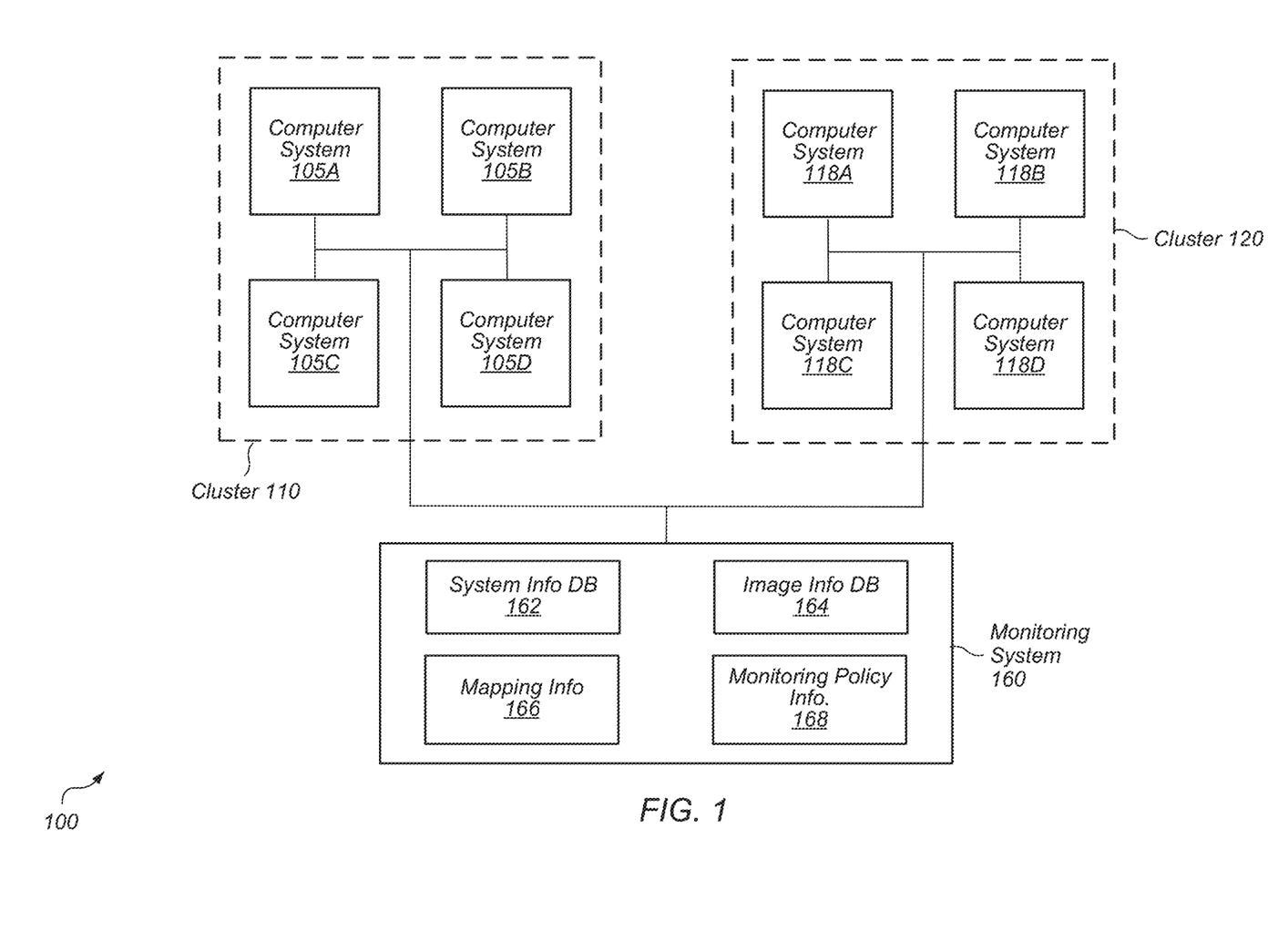
FIG. 1 illustrates a block diagram of a system that relates in various embodiments to ways in which computer systems can be organized and monitored.

Turning to FIG. 1, a block diagram of a system 100 is shown. This diagram relates in various embodiments to ways in which computer systems can be organized and monitored. In this diagram, system 100 includes computer systems 105A, 105B, 105C, 105D, (hereinafter computer systems 105) 118A, 118B, 118C, and 118D (hereinafter computer systems 118), as organized into clusters 110 and 120. System 100 also includes a monitoring system 160 in this embodiment.

In the embodiment of FIG. 1, computer systems 105 and 118 are logically separated into two different clusters. Each of these clusters may be configured to perform distinct computing tasks, which each of the systems in the cluster contributing toward service. The clusters can be organized to perform tasks in parallel (e.g. two or more systems simultaneously handling portions of a request) or can be organized to perform tasks in a load-sharing sharing effort (e.g., computer system 105A handles a first request while computer system 105B handles a second request). In one embodiment, clusters 110 and 120 perform tasks related to processing electronic payments, such as those handled by an electronic payment processor such as PayPal™.

Monitoring system 160 is configured, in the embodiment shown, to receive various system attribute information from computer systems 105 and 118, and/or other sources such as network monitoring equipment. This system attribute information is described in further detail relative to FIG. 2, but may be stored by monitoring system 160 in system information database 162.

Monitoring system 160 may also be used to transform system attribute information into an image that correlates to various values included in the system attribute information. Accordingly, system attribute information that indicates computer system 105A is currently averaging 50% CPU load capacity, 80% random access memory (RAM) capacity, and 25 Mbps of network bandwidth can be mapped into image information usable to generate an image. A different looking image might be generated when computer system 105A is averaging 100% CPU load capacity, 65% random access memory (RAM) capacity, and 133 Mbps of network bandwidth, however. As discussed further below, by mapping system attribute information into an image space (e.g., a 2D, 3D, or other dimensional image), it may be easier to detect and locate possible configuration and/or performance issues.

Accordingly, mapping information 166 can be accessed to help translate system attribute information into a particular image. This mapping information, in various embodiments, includes information about how big an image to make (e.g., 200×200 pixels, 1000×1000 pixels), where and how particular features should be mapped (e.g., CPU usage should be mapped to pixels in the top left quadrant using black/white on a color scale from 0 to 255, etc.), or what type of image should be used (e.g., JPG, GIF, FBX, X3D). Accordingly, image mapping values may be normalized within a range. More information on mapping is provided below. Note that in various embodiments, all generated images for a variety of different systems may be of the same size. E.g., for clusters 110 and 120, all generated images might be 800×800, 200×200, 1000×150, or any other desired size (as well for 3D images).

Monitoring policy information 168 is also included in monitoring system 160 in the embodiment shown. This information may correspond to one or more monitoring policies, and include values and thresholds upon which notifications (e.g. alerts) can be sent to a user. For example, a monitoring policy might indicate that any time a particular computer system in cluster 110 is using 20% more CPU than the average of all other systems, an alert should be generated. Many different reporting options can be specified by a monitoring policy, including alerts that a server system may have drifted in its configuration significantly from other systems in a cluster.

Note that many different equipment configurations are possible, and this disclosure is not limited to the organization shown in FIG. 1. For example, various networking and other equipment is not shown in FIG. 1. Other clusters and other systems may be present as well as will be apparent to one with skill in the art.

Figure 2:
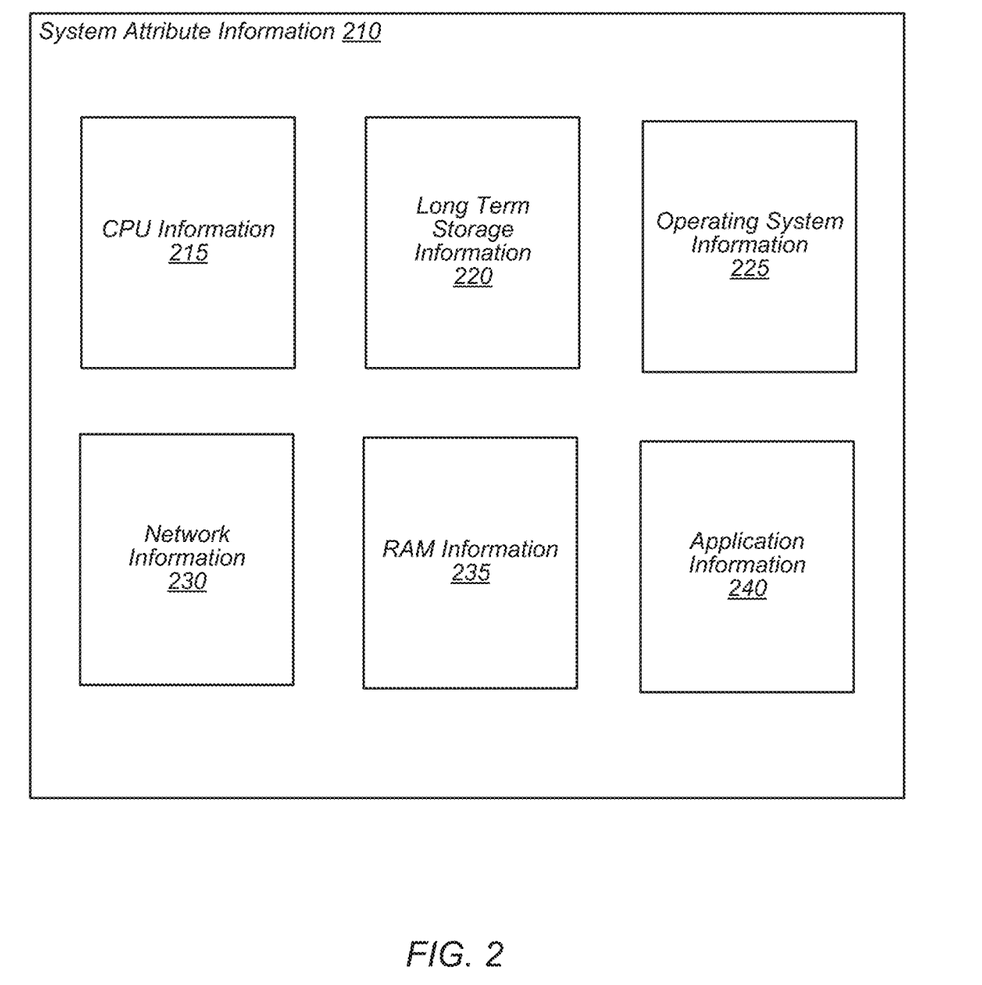
FIG. 2 illustrates a block diagram of one embodiment of system attribute information that can be used for creating images corresponding to computer systems for which the system attribute information was collected.

Turning to FIG. 2, a block diagram is shown of one embodiment of system attribute information 210. System attribute information 210, in various embodiments, may be received by monitoring system 160 and maintained for each of a plurality of different computer systems (such as systems 105 and 118). System attribute information 210 can be maintained over time, where different sets of information are stored for different periods of time (e.g. at periodic intervals such as once a minute, once an hour, once a day, etc., depending on desired spacing).

Accordingly, system attribute information 210 may contain a variety of information about a computer system. This information may include values for one or more operating parameters. Each of the items shown within system attribute information in FIG. 2 may therefore have one or more values and one or more operating parameters for each of a plurality of computer systems. System attribute information 210 may also be organized according to cluster and otherwise contain metadata specifying information about the systems for which the information is collected (hardware configuration, system name and/or IP address, etc., services running or believed to be running on the system etc.). Note that generally, in various embodiments, system attribute information 210 can contain any information regarding a computer that the user desires to monitor and measure and is not limited to the categories and examples discussed below. Also, note generally that any of system information 210 may be collected either for an instantaneous moment in time (e.g., CPU usage at a given time) or for a period of time (e.g., a periodic interval, or a time since a last interval or last event (such as system reboot)), as applicable.

CPU information 215 includes information regarding CPU hardware usage in some embodiments. This information may include average CPU load (e.g., 50% average load over the last 5 minutes, 30 minutes, 4 hours, etc., or instantaneous load if desired), CPU temperature, CPU cache usage statistics, etc. Similar information may also be maintained for graphics processing units (GPUs), or specialized hardware computing devices such as ASICs (which may be used for cryptographic operations, for example).

Long term storage information 220, in one embodiment, includes information regarding hard drive storage (magnetic or flash, for example) or other relatively slower storage that is generally used to permanently maintain data (e.g., tape drives). This information may include amount of data stored on each of a plurality of storage devices, total amount of data stored by the system, percentage of maximum storage utilization, average disk access speed for reads and/or writes, etc.

Operating system (OS) information 225, in one embodiment, includes information regarding various OS-related actions, processes, and services. Thus, this information can include number of process context switches (e.g., since a last period in time or cumulative since a system reboot), number of page faults (e.g., since a last period in time or cumulative since a system reboot), number of processes running, amount of swap space being used, percentage of system resources (RAM, CPU, bandwidth, etc.) being used by particular processes, etc. OS information 225 can also include a response time for an application service request to an application service. Thus, if one or more machines in cluster 110 are being used, e.g., to implement an electronic payment transaction service, response time information could be collected about whether, e.g., consumer requests to issue a payment to another party took 20 ms, 500 ms, 10 seconds, or some other length of time to occur (such information may be aggregated and/or averaged for multiple requests).

Network information 230, in one embodiment, includes information about average bandwidth usage within a time period (e.g., last 5 minutes, last hour, last 24 hours, etc.), which may include subdivisions for upload/download usage, total bytes transmitted since a period in time (e.g. since a system reboot), average latency (ping, TCP 3-way handshake parameters, etc.) to one or more particular systems within a time period, a number of packets transmitted from or to a particular software port number (e.g., port 80/HTTP, port 443/HTTPS, or others), a number of packets transmitted using particular network protocols (e.g. TCP, UDP, etc.), or a number of packets transmitted using particular application layer protocols (e.g., HTTP, FTP, etc.).

RAM information 235, in one embodiment, includes information about usage of random access memory for a computer system. This can include an amount of physical RAM in use, an amount of physical RAM that is free, etc.

Application information 240, in one embodiment, includes information on one or more applications that are executing and/or installed on a computer system. This can be any kind of application specific or application-related information as defined by a user/administrator. This could include number of requests serviced (e.g., database read requests, database write requests), number of requests received, bytes written to storage, bytes read from storage, etc. Application information 240 can also include number of requests made to particular OS services, other system services, and/or other systems. For example, if application information 240 pertains to an electronic payment transaction, a system may have to make internal requests to multiple other systems and/or databases to process an external request from a user (e.g., checking that the user has sufficient funds, running a fraud/risk check to make sure a requested payment does not appear fraudulent, etc.). Application information 240 can also contain application error data, such as a number of application level errors that have occurred, a type of application error (e.g., fatal, non-fatal, other), and any other metadata about an error event that has occurred for an application (e.g., a copy of a request, such as an HTTP request, that may have triggered the error, a file name or location involved in the error, or any other information relevant to the error).

Figure 3:
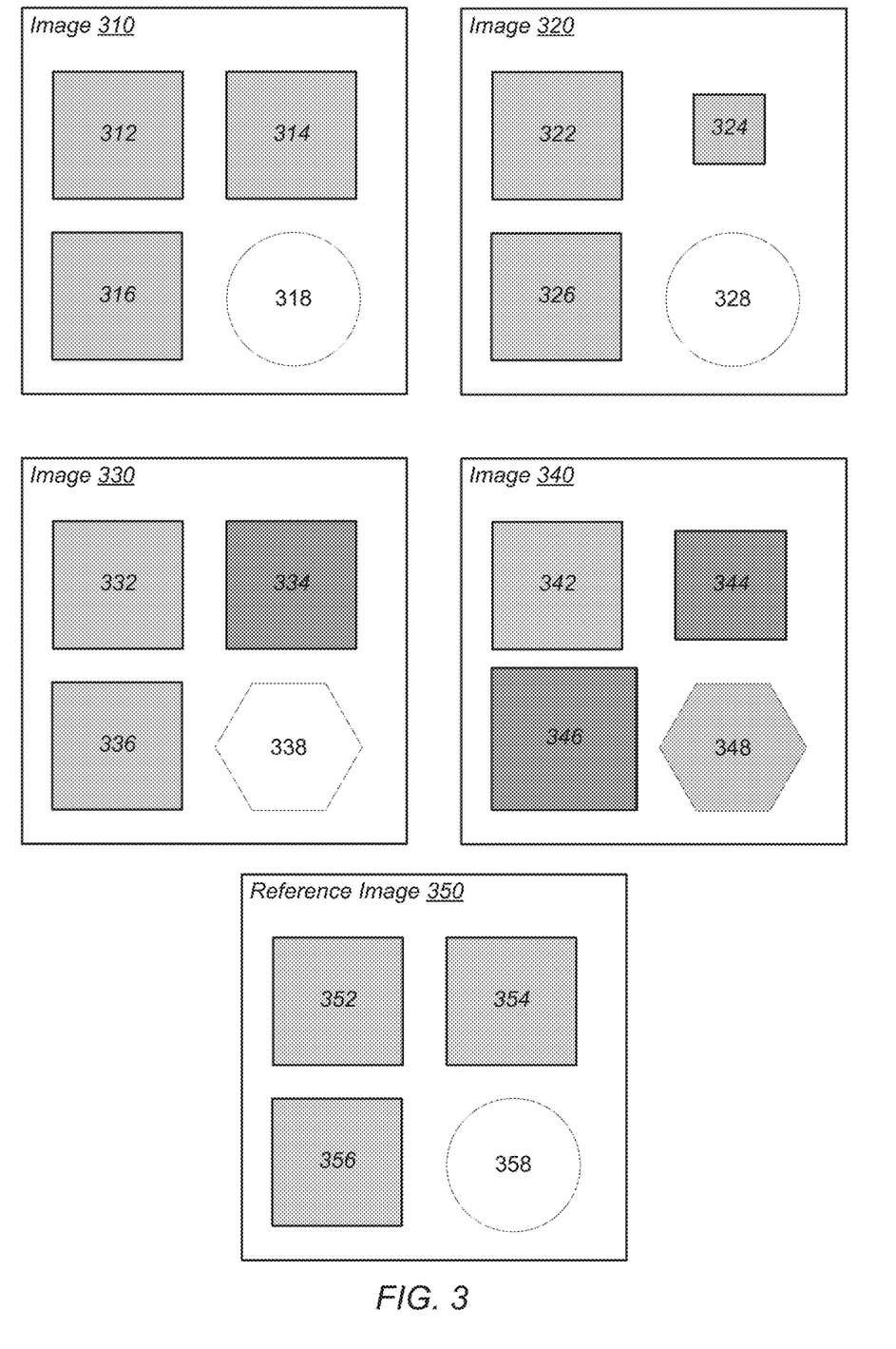
FIG. 3 shows a block diagram is shown of several images corresponding to system attribute information, according to some embodiments.

Turning to FIG. 3, a block diagram is shown of several images corresponding to system attribute information. Each of the image shown is generated from, in various embodiments, particular system attribute information 210 that has been collected.

In the embodiment of FIG. 3, images 310, 320, 330, and 340 respectively correspond to system attribute information for computer systems 105A, 105B, 105C, and 105D at a particular time. Reference image 350 will also be described in more detail, but relates to an image generated from a reference sample of system attribution information.

Image 310, as shown, includes graphical regions 312, 314, 316, and 318. Each of these regions may be generated from various system attribute information according to mapping information 166. Thus, region 312 may be generated from CPU information 215 while regions 314, 316, and 318 may be generated respectively from OS information 225, network information 230, and application information 240. This is merely an example, however, and there may be more or less graphical regions that map to particular system attribute information in various embodiments. The regions may vary in size and shape, in color or texture, or any other number of visual and/or spatial characteristics. One or more of the graphical regions in an image may also overlap, in various embodiments, although are not shown as doing so in the embodiment of FIG. 3 for ease of understanding and explanation. Note that graphical regions may also be three dimensional regions in some instances.

Reference image 350 is used, in the embodiment of FIG. 3, to determine whether a configuration discrepancy exists for any of computer systems 105A, 105B, 105C, and 105D. In this embodiment, reference image 350 corresponds to system attribute information for a fresh install (e.g., from a mirrored configuration) for one or more of computer systems 105. Reference image 350 can, in one embodiment, be an averaged image for each of systems 105 after all systems have had a fresh install, for example. In the embodiment of FIG. 3, reference image 350 is considered to be a "good" configuration with acceptable characteristics—that is, if another image matches reference image 350 (e.g. within a certain tolerance), the system for that image will be deemed not to have a configuration discrepancy. Note that reference image 350, or any image based on system attribute information, may be based on less than all operating parameters of a respective system. E.g., a defined category can be used, such as "networking information", which might include various bandwidth and packet data. The defined category can vary as desired by embodiment.

In this example, image 310 is identical to reference image 350. Thus, when comparing image 310 to reference image 350, it can be determined that computer system 105A (which corresponds to image 310) is not considered to have a configuration discrepancy, e.g., computer system 105A is operating within acceptable parameters.

Image 320 includes graphical regions 322, 324, 326, and 328. Regions 322, 326, and 328 are identical to corresponding regions 352, 356, and 358 in reference image 350. However, region 324 is substantially smaller than corresponding region 354 (even though it has the same color and the same shape of a square). Based on this difference in size, computer system 105B may be deemed to have a configuration discrepancy, indicating that its system attribute information has deviated to some substantial degree from what is deemed to be acceptable (e.g. ordinary) operating parameters.

Image 330 includes graphical regions 332, 334, 336, and 338 in the embodiment shown. Regions 332 and 336 are identical to corresponding regions 352 and 356 of reference image 350, and thus may be deemed to indicate that no configuration discrepancy exists for computer system 105C in regard to underlying system attribute information used for those graphical regions.

Graphical region 334 is somewhat darker in color than corresponding graphical region 354. However, graphical region 334 has the same size and shape of graphical region 354. Thus, despite the difference in color, graphical region 334 may be deemed to indicate that no configuration discrepancy exists for computer system 105C in regard to underlying system attribute information used for that graphical region (e.g., the region is within an acceptable degree of visual closeness). Likewise, while graphical region 338 differs somewhat in shape and area to graphical region 358, graphical region 338 may also be deemed within an acceptable amount of difference. Accordingly, as a whole, image 330 may be deemed to indicate that no configuration discrepancy exists for computer system 105C.

Image 340, as shown, includes graphical regions 342, 344, 346, and 348. Each of these regions, when examined individually, may be deemed to be within an acceptable margin to corresponding regions 352, 354, 356, and 358 of reference image 350. However, note that each of regions 344, 346, and 348 does differ substantively in one or more characteristics (e.g., size, shape, color) to respective regions 354, 356, and 358. Thus, as a whole, because of the number of overall discrepancies (even if each individual discrepancy may not be severe), image 340 may be deemed to indicate that a configuration discrepancy does exist for computer system 105D.

A configuration discrepancy, if detected, can indicate that a system is operating outside of expected or acceptable parameters, and corrective action may need to be taken. In one embodiment, a system with a configuration discrepancy could be taken offline briefly and re-imaged to a previous known "good" configuration. This may prevent a more serious and costly problem from occurring at a later time, were the configuration discrepancy to go undetected. For example, performing re-imaging could prevent an application service (e.g., electronic payment transaction processing) collectively implemented by cluster 110 from failing, or suffering from severe performance issues. If computer system 105D were suffering from a memory leak, for example, that takes 3 weeks to become a severe problem, re-imaging at 2.5 weeks of uptime might avoid the problem entirely. Other actions may also be taken if a configuration discrepancy is detected, such as alerting a user/administrator, capturing debugging or other information, etc.

Figure 4:
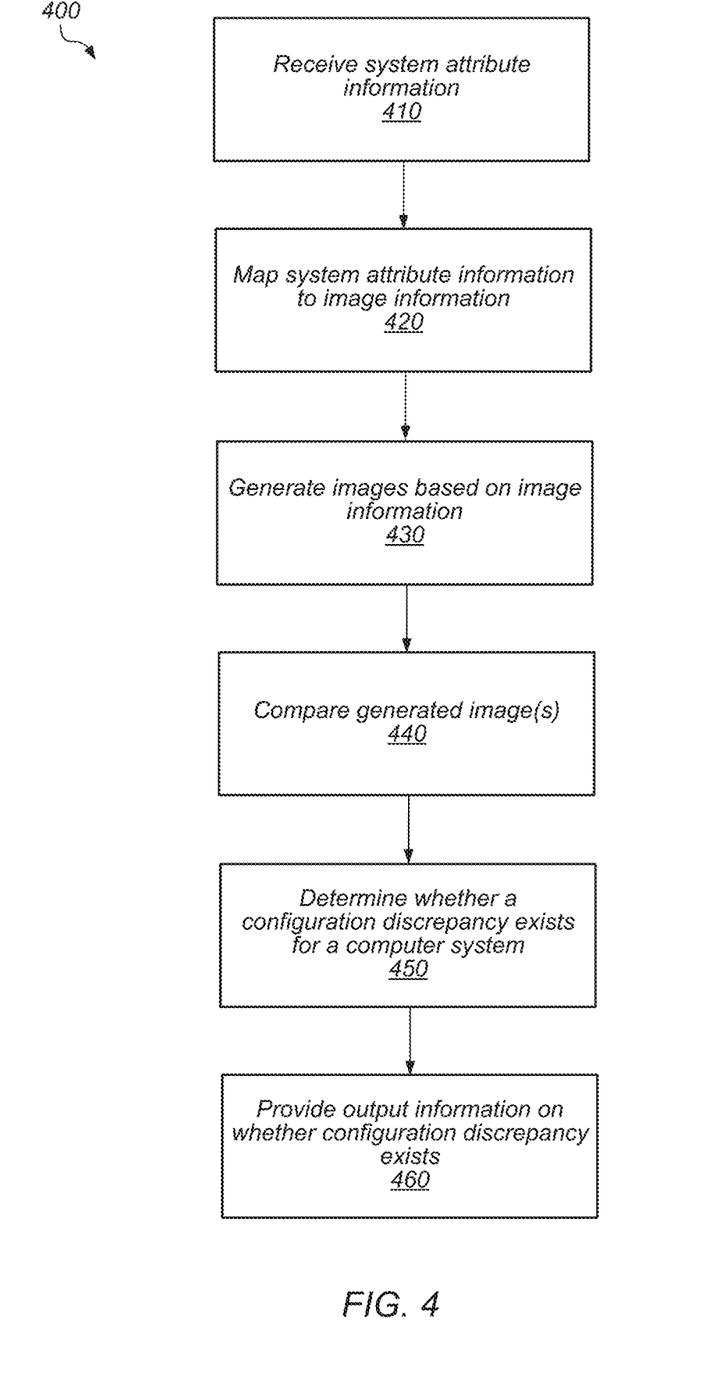
FIG. 4 illustrates a flowchart of a method that relates to using system attribute information to create an image corresponding to a computer system, and using that image to determine whether a configuration discrepancy exists for that computer system, according to some embodiments.

Turning to FIG. 4, a flowchart diagram is shown of one embodiment of a method 400 that relates to using system attribute information to create an image corresponding to a computer system, and using that image to determine whether a configuration discrepancy exists for that computer system.

Any or all operations described in method 400 may be performed by one or more processes running on monitoring system 160 in some embodiments, or one or more processes running on any suitable computer system or electronic device in other embodiments (e.g., such as one of computer systems 105 or 118). In some embodiments, one or more parts of the operations of method 400 can be performed on different systems as well. For ease of explanation, however, operations described below will simply refer to monitoring system 160.

In operation 410, monitoring system 160 receives system attribute information corresponding to a plurality of computer systems, where the system attribute information indicates values for a plurality of operating parameters of the plurality of computer systems, in one embodiment. Thus, operation 410 may include receiving system attribute information from computer systems 105 and/or 118. Operation 410 can include receiving system attribute information from an intermediary system (not shown) as well.

In one embodiment, operation 410 includes receiving a first portion of system attribute information via a plurality of system agents executing on a plurality of computer systems, while a second portion of system attribute information is received via a measurement of a network parameter involving one or more of the plurality of computer systems. That is, in some instances, certain information may be received directly from systems (e.g., CPU usage level, RAM usage level, CPU core temperature, etc.) while other information can be received indirectly from outside observations (e.g., how long it takes a system to respond to a ping request, how many bytes of network traffic per second a system appears to be sending or receiving, etc.). Again, note that such values (as generally for all values for system attribute information) can represent an instantaneous usage or a time-averaged usage for some particular period of time.

In operation 420, monitoring system 160 maps system attribute information (e.g., from operation 410) to image information for each of the computer systems having system attribute information, in one embodiment. Mapping system attribute information to image information may include accessing translation data to determine how particular system attribute information will be translated to an image file (e.g. 2D or 3D image). For example, a set of translation data may indicate upper and lower boundaries for particular data, which can be normalized across different data ranges in various embodiments.

A particular quadrant (or other area) of a 2D or 3D image, for example, could have system attribute information for all networking-related data. This particular area can be mapped or subdivided in different ways. In a 1000×1000 pixel image, for example, pixels locations (0,0) to (499,499) could be various combinations reflective of underlying values for number or bytes of packets transmitted, number or bytes of packets received. number or bytes of packets transmitted or received using a particular protocol (UDP, IP, TCP, etc.), average MB/s of data transmitted for a particular period of time, MB/s of data transmitted for a particular period of time by one or more particular applications, or any number of other network related data.

Pixel values for 2D or 3D images can be generated in any variety of ways. Pixels defining a rectangle from (0,0) to (9, 499) for example, could have network-related information shown going left to right for a period of time. Thus, a 10×50 block of pixels might represent network information from a time T0 to T1, the next 10×50 blocks of pixels could be for time T1 to T2, etc. Color, opacity, hue intensity, etc., may all be varied when mapping system attribute information to image information. Mapping in operation 420 can therefore include fitting individual values for a plurality of computer operating parameters (such as CPU, bandwidth usage, etc.) to a plurality of pixels each having at least a minimum hue value and a maximum hue values. The minimum and maximums could range from a full amount supported by an image format (e.g., 0-255) or could be constrained in other ways (e.g., from 25-180 when the image format actually supports 0-255). This could be done for visibility reasons, for example, as it could be harder in some instances to visually see differences in data if it is displayed at an extreme of light or dark.

Note that particular system attribute information can be mapped to multiple portions of an image depending on embodiment. Thus, if a web server (e.g., HTTP/HTTPS daemon) transmits an average of 3 MB/s of traffic out on ports 80 and 443, this information can affect the visual appearance of multiple different parts of an image. If the image has a first portion for network related data, for example, and another portion for application-specific data, both of these portions may be affected in visual appearance by the system attribute information data for the web server. Stated another way, in various embodiments, the visual appearance of one or more groups of pixels may be affected by the same underlying system attribute information. Mapping information 166 includes a variety of rules and specifications for one or more different scenarios regarding how system attribute information is mapped to image information.

In some embodiments, facial images can be used to map system attribute information to image information. For example, one or more images of one or more real persons can be used as a target onto which system attribute information can be mapped. Using such images, a facial recognition algorithm can be executed to identify one or more faces present in the image. After recognizing one or more facial areas, these areas can then be used to map system attribution information onto, thus generating image information for an image corresponding to one or more particular computer systems. Images with a single or multiple different faces can be used. Areas outside of the facial areas can be subtracted from the image (e.g. whited out, blacked out, greyed out, and/or modified in another way by changing pixel values) in some cases such that the image generated for a system may have the facial areas in starker contrast to surroundings. Then, when comparing images, facial recognition algorithms can be also be used between images for computer systems.

In other embodiments, instead of using real-world images of people, circular or oval-based areas can be used to approximate facial areas. In these embodiments, system attribute information may be mapped into these areas as well. Facial recognition algorithms can again be used for comparing such images. Again, note that the mapping of system attribute information can be performed in various ways (and multiple ways can be used in a same image, in some embodiments).

In operation 430, one or more images are generated by monitoring system 160 based on image information (e.g., from operation 420) in various embodiments. Operation 430 may therefore comprise storing image information in a particular file format (e.g. JPEG, GIF, etc.). Generating an image in operation 430 can also include scaling the image to be of a particular size. In one embodiment, operation 430 includes generating a plurality of 2D images that include one or more images for each respective system of a plurality of computer systems (i.e., systems for which attribute information has been received).

In operation 440, monitoring system 160 compares one or more generated images (e.g. from operation 430) with one or more other generated images. In one embodiment, this includes comparing an image for computer system 105A with a reference image (e.g. reference image 350). An image for a system may be compared with another system image (e.g. 105A to 105B), or an image may be compared to a cluster average (e.g. 105A to an average image for the systems in cluster 110).

The comparing for operation 440 may, in various embodiments, include performing comparisons on different portions of images to other corresponding portions of other images. That is, if a particular image region is being used to map particular system attribute information, a corresponding image region for one or more other images may serve as a comparison basis. For example, if CPU and memory usage data is represented in a bottom-right portion of an image, then those portions may be compared for all applicable images. Accordingly, the comparing for operation 440 may include comparing various different sub-regions of different images.

Comparing images, in operation 440, can include comparing images using an image comparison algorithm, such as a 2D or 3D image comparison algorithm. These comparison algorithms can include facial recognition algorithms, in some cases. In making a comparison, a determination may be made as to whether one or more measurable differences exists between two images that are greater than a threshold value. For example, an RGB pixel value could have 8 bits (0-255) for each of red, green, and blue. A difference may be deemed to exist if values between comparison pixels vary by more than 16, or any other threshold value. In some cases, a red color value threshold might be set at 16, while a green or blue threshold could be set at 8, 24, or any other value.

Comparing for an image for a first computer system can be performed against an average image for a cluster of two or more computer systems. For example, cluster 110 has computer systems 105A, 105B, 105C, and 105D. An image for 105A can be compared to an average image generated for all of 105A-105D to see if that particular system has deviated in some substantial manner (e.g. past a measuring threshold) for one or more pieces of system attribute information. An image for 105A can also be compared to an average image for a limited subset of the cluster (e.g., image for 105A compared to an image for the average of 105B, 105C, and 105D only).

In one embodiment, operation 440 includes for a first server pool, comparing 2D images for a first plurality of computer servers and for a second server pool, comparing 2D images for a second plurality of computer servers. In other words, systems in different server pools may be compared amongst themselves but not each other, in some cases. A first server pool may be dedicated to databases that handle personally identifying information (PII) for example, while a second server pool could be dedicated to databases that assess risk for a financial transaction request.

In another case, however, different server pools (e.g. clusters) might be configured to perform the same or similar logical tasks. Thus, operation 440 may comprise comparing an averaged 2D image for a first server pool to an averaged 2D image for a second server pool to determine if a configuration discrepancy exists between the first and second server pools. The averaged images, in this embodiment, would represent an average for each of one or more systems in the respective server pools (outlier systems could be thrown out of the data, if desired, for purposes of this comparison). Such an approach could be helpful when the configurations for individual systems of different server pools may have each drifted in different directions, such that within each pool, the systems are relatively similar, but across the different pools there is a discrepancy, which could indicate a problem for an application service handled by the pools.

Timeline/historical information can also be collected for any of the images generated from system attribute information (e.g. in operation 420). For example, a series of images for computer system 105A can be generated at different times T1, T2, T3, etc. These times could be at a regular periodic interval (for example, covering increments of one hour or another time period). Comparisons can be made for a particular system (e.g. for operation 440) to determine how it may have changed and to see if a configuration discrepancy has occurred.

Once the series of images are collected, they can also be formed into an animation (e.g. a movie) so that the information for that system can be easily viewed over time. Changes to system configuration can be observed, and a user may be able to detect patterns or drifts that might not otherwise be apparent from looking at, e.g., raw underlying data. The animated images may be organized as a movie in any suitable format, such as .GIF, .MP4, .AVI, .FLV, etc. An animated movie of the images can be displayed via a web portal implemented on monitoring system 160 and transmitted to a viewing user at a remote system.

In operation 450, based on the comparing, monitoring system 160 determines whether a configuration discrepancy exists, in one embodiment. This operation may include determining whether a configuration discrepancy exists between two systems, such as two systems in a cluster (e.g. 105A and 105B). Operation 450 can also include determining whether a configuration discrepancy exists between a currently operative system and a system for which a reference image was prepared (e.g., a "fresh install" system).

Determining whether a configuration discrepancy exists may include a determination based on whether a measurable difference exists between two images being compared, particularly if that difference is over a threshold value, in some embodiments. As discussed above, images may differ from one another but may or may not be considered to be indicative of a configuration discrepancy depending how large a degree of difference there is. Various configurations can be specified by a user on whether or not a configuration discrepancy is indicated by a particular difference for particular visual characteristics (reflective of particular underlying system attribute information). Monitoring policy information 168 may include various specifications, in different embodiments, indicating what sorts of differences between images (color, brightness, size of regions, etc.) may or may not be deemed to indicate that a configuration discrepancy exists.

In operation 460, monitoring system 160 provides output information indicating whether a configuration discrepancy exists, in one embodiment. This may include transmitting the output information as an alert to a user (e.g. an administrator or any other type of user). The output information may indicate whether one or more particular computer systems are in or out of compliance with a configuration policy, e.g., as may be defined in monitoring policy information 168. The providing done in operation 460 can be via email, text message, voice message, or other medium. This providing can also include storing the information on a storage medium for later reference, in one embodiment.

Graph Operations

In various embodiments, system attribute information can be used to create a graph corresponding to computer systems, such as those in clusters 110 and 120. Monitoring system 160, or another system, may perform some or all of the operations described relative to graphs below.

Graph operations may be used, for example, to identify malicious activities/behaviors on different devices (including servers and any other connected device(s)) in various instances. System attribute information, particularly as compared between different nodes (e.g. in a cluster) can indicate whether malware or other anomalous behavior is present. Each node (e.g., corresponding to a computer system) may be represented in a graph with system attribute information including but not limited to one or more or all of the processes executing on a system, their network connections, performance such as CPU, memory etc., process attributes such as size in memory, name of executable, etc., system calls performed by various processes, and any other system attribute information as described above.

After a graph is generated, for each node, monitoring system 160 can calculate one or more differences between each node for a plurality of computer systems such as cluster 110 or 120. Differences can be calculated visually from images generated for the systems using techniques described above, and/or may be calculated from system attribute data prior to that data being mapped to image data.

Subgraphs within a generated graph can be detected by analyzing nodes in the generated graph. Using system attribute information and/or visual comparison information, a difference can be assigned for one or more edges between nodes in the graph. For example, all edges may be given a weight, in one embodiment. These assigned weights can be indicative of a perceived difference between two different nodes (e.g. a difference in configuration between two computer systems in cluster 110, for example). Thus, a difference between nodes for computer systems 105A and 105B, for example, could be assigned one or more numeric values on one or more scales. This could be as simple as assigned normalized values from 1-10, 1-100, or some other scale (with, e.g., 100 being a max difference between two nodes in the graph). In some embodiments, the difference between two nodes (for graph purposes) may be based on only a subset of system attribute information—for example, we may be only interested in looking at how performance of a particular application (say, APACHE web server). In such a case, application performance statistics may be used to give a weight to edges between nodes, by looking at, for example, average or total number of HTTP requests served per time period, average response time, peak response time, average or total number of dropped requests per time period, amount of memory and/or CPU used by application, etc.

In another instance, a directed graph can be drawn for a single system of group of systems. This directed graph may or may not be used for image comparison purposes.

The directed graph, in one embodiment, is a graph for processes running on a system (or group of systems). In this case, each process may be a node. A parent-child relationship between processes (e.g., process A spawned process B) will give rise to a directed edge between the two processes in this embodiment, showing the parent-child relationship. Other static information about processes may also be stored as relationship data values for the edge between nodes. Dynamic data that is generally subject to change, such as amount of memory, CPU, network, and other usage (for processes), can be stored as attribute information at each of the nodes in the directed graph.

The directed graph can be searched to find patterns of behavior and/or links between processes. In one instance, subgraphs within a generated directed graph can be searched for by monitoring system 160 to see if some characteristic portion of the graph (containing less than all nodes in the graph) indicates malicious behavior (e.g. by malware). This process can be iterated repeatedly to then determine a smallest subgraph that indicates the malicious behavior, e.g., finding the smallest "footprint" in the directed graph for the malicious behavior, which could correspond to malware. Dykstra's algorithm can be used to find shortest paths to do this, for example. If a subgraph is found indicating malicious behavior, this can be reported to a user (and the subgraph can be later used for malware detection—once the fingerprint is known, it can be used when analyzing other systems. To find a known fingerprint, for example, known malicious code can be stored on a system and then analyzed, such that monitoring system 160 can know what the particular malicious behavior and/malware is for a particular subgraph indicative of this).

Thus, in one embodiment, monitoring system 160 (e.g. or another system) may generate a graph comprising a plurality of nodes corresponding to the plurality of computer systems, wherein each of the plurality of nodes includes attribute information based on system attribute information for a respective one of each of the plurality of computer systems. These nodes can be for systems for which image information has been generated, for example. Monitoring system 160 can further calculate a difference between each node of the plurality of nodes, wherein the calculating is based on differences between values in the system attribute information for each of the plurality of nodes, as indicated above. Further, based on one or more of the calculated differences, monitoring system 160 may determining whether one of the plurality of computer systems has a behavior profile matching one or more predetermined application profiles. For example monitoring system 160 may determine if malware is present or if a particular service appears to be running on a system.

Computer-Readable Medium

Figure 5:
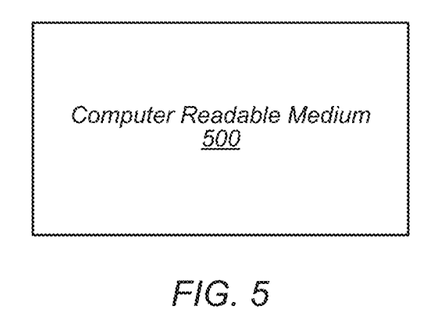
FIG. 5 is a block diagram of one embodiment of a computer readable medium.

Turning briefly to FIG. 5, a block diagram of one embodiment of a computer-readable medium 500 is shown. This computer-readable medium may store instructions corresponding to the operations of FIG. 4 and/or any techniques described herein. In various embodiments, instructions corresponding to monitoring system 160 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VB Script. Note that as used herein, the term "computer-readable medium" refers to a non-transitory computer readable medium.

Computer System

Figure 6:
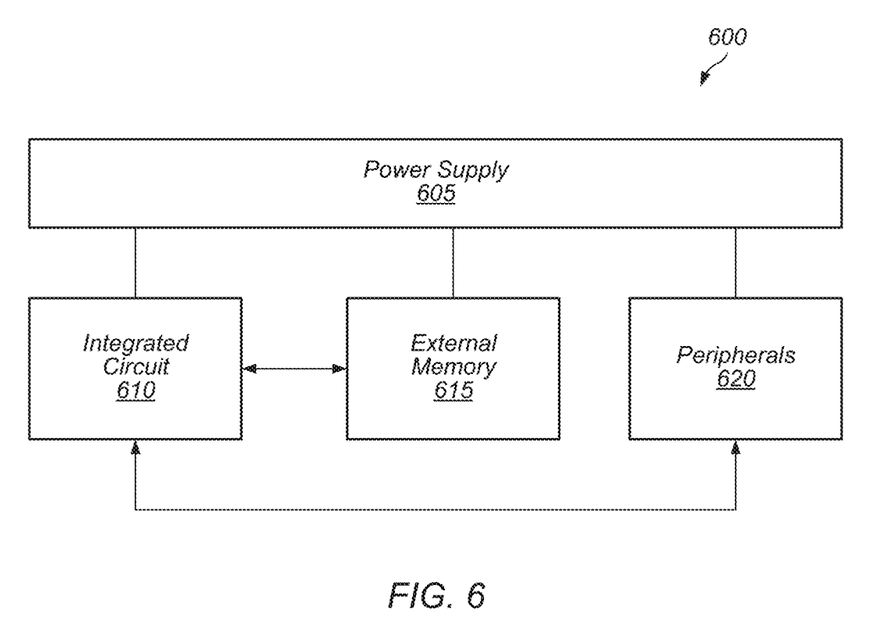
FIG. 6 is a block diagram of one embodiment of a computer system.

In FIG. 6, one embodiment of a computer system 600 is illustrated. Various embodiments of this system may be any of computer systems 105A-105D or any other computers systems as discussed above and herein. The abovementioned systems are not limited to the configuration shown in FIG. 6, however.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as Wi-Fi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
 a processor; and
 a memory having stored thereon instructions that are executable by the processor to cause the system to perform operations comprising:
 receiving system attribute information corresponding to a plurality of computer systems, the system attribute information indicating values for a plurality of operating parameters of the plurality of computer systems;
 mapping the system attribute information to two-dimensional (2D) image information for each of the computer systems;
 generating a plurality of 2D images comprising, for each of the computer systems, a respective 2D image based on the 2D image information;
 generating a first averaged 2D image for a first server pool that comprises a first plurality of computer systems and a second averaged 2D image for a second server pool that comprises a second plurality of computer systems, wherein the first averaged 2D image comprises averaged values for the plurality of operating parameters of the plurality of computer systems in the first server pool and the second averaged 2D image comprises averaged values for the plurality of operating parameters of the plurality of computer systems in the second server pool;
 comparing the first averaged 2D image for the first server pool to the second averaged 2D image for a second server pool;
 based on the comparing, determining whether a configuration discrepancy exists between at least a first one of the first plurality of computer systems and a second one of the second plurality of computer systems; and
 providing output information indicating whether the configuration discrepancy exists.

2. The system of claim 1, wherein comparing the first averaged 2D image to the second averaged 2D image includes using a 2D image comparison algorithm; and
 wherein determining whether the configuration discrepancy exists is based on whether a measurable difference between the first averaged 2D image and the second averaged 2D image exceeds a threshold value.

3. The system of claim 1, wherein at least a first portion of the system attribute information is received via a plurality of system agents executing on the plurality of computer systems, and wherein at least a second portion of the system attribute information is received via a measurement of a network parameter involving one or more of the plurality of computer systems.

4. The system of claim 1, wherein the operations further comprise:
for the first server pool, comparing 2D images for a first plurality of computer servers in the first server pool; and
for the second server pool, comparing 2D images for a second plurality of computer servers in the second server pool.

5. The system of claim 1, wherein
comparing the first averaged 2D image for the first server pool to a first image of the plurality of 2D images to determine whether the configuration discrepancy exists.

6. The system of claim 1, wherein the operations further comprise:
comparing a baseline 2D image corresponding to an earlier time for the first one of the first plurality of computer systems to a first 2D image of the plurality of 2D images, wherein the first 2D image corresponds to a later time for the first one of the first plurality of computer systems.

7. The system of claim 1, wherein the mapping comprises correlating individual values for a plurality of operating parameters with a plurality of pixels each having at least a minimum hue value and a maximum hue value.

8. A method, comprising:
receiving system attribute information corresponding to a plurality of computer systems, the system attribute information indicating values for a plurality of operating parameters of the plurality of computer systems;
based on the system attribute information, generating a plurality of images comprising, for each of the computer systems, a respective image based on the system attribute information, wherein the generating is based on a mapping of the system attribute information to a plurality of pixel values;
generating a first averaged two dimensional (2D) image for a first server pool that comprises a first plurality of computer systems and a second averaged 2D image for a second server pool that comprises a second plurality of computer systems, wherein the first averaged 2D image comprises averaged values for the plurality of operating parameters of the plurality of computer systems in the first server pool and the second averaged 2D image comprises averaged values for the plurality of operating parameters of the plurality of computer systems in the second server pool;
comparing the first averaged 2D image for the first server pool to the second averaged 2D image for a second server pool;
based on the comparing, determining whether a configuration discrepancy exists involving at least a first one of the first plurality of computer systems that corresponds to the first image; and
providing output information indicating whether the configuration discrepancy exists.

9. The method of claim 8, wherein the first averaged 2D image for the first server pool is based on averaging pixel values from two or more of the plurality of images for the plurality of computer systems in the first server pool.

10. The method of claim 8, further comprising transmitting the output information as an alert to a user associated with the plurality of computer systems, wherein the output information indicates that the first computer system is out of compliance with a configuration policy.

11. The method of claim 8, wherein the values for the plurality of operating parameters include one or more of CPU execution time, network bandwidth usage, network latency, random access memory (RAM) usage, number of context switches, number of page faults, or a response time for an application service request to an application service.

12. The method of claim 8, further comprising:
creating a time-lapse series of images for the first server pool; and
displaying the time-lapse series, wherein the displaying is visually indicative of changes to configuration of the first server pool over time.

13. The method of claim 8, wherein the first image is based on a subset that is less than all of the plurality of operating parameters, the subset corresponding to a defined category of operating information.

14. The method of claim 8, wherein the plurality of images are 2D color images.

15. The method of claim 8, wherein the plurality of images are 2D greyscale images.

16. A non-transitory computer-readable medium having stored thereon instructions that are executable by a computer system to cause the computer system to perform operations comprising:
receiving system attribute information corresponding to a plurality of computer systems, the system attribute information indicating values for a plurality of operating parameters of the plurality of computer systems;
based on the system attribute information, generating a plurality of images comprising, for each of the computer systems, a respective image based on the system attribute information, wherein the generating is based on a mapping of the system attribute information to a plurality of pixel values;
generating a graph comprising a plurality of nodes corresponding to the plurality of computer systems, wherein each of the plurality of nodes includes attribute information based on system attribute information for a respective one of each of the plurality of computer systems;
calculating a difference between each node of the plurality of nodes, wherein the calculating is based on differences between values in the system attribute information for each of the plurality of nodes;
based on one or more of the calculated differences, determining whether one of the plurality of computer systems has a behavior profile matching one or more predetermined application profiles; and
providing output information indicating whether one of the plurality of computer systems has the behavior profile matching the one or more predetermined application profiles.

17. The non-transitory computer-readable medium of claim 16, wherein the operations further comprise:
creating a time-lapse series of images for at least one of the computer systems; and
displaying the time-lapse series, wherein the displaying is visually indicative of changes to configurations of the at least one of the computer systems over time.

18. The non-transitory computer-readable medium of claim 16, wherein the operations further comprise: determining whether a configuration discrepancy exists based on whether the content of a first of the plurality of images has color values beyond an acceptable threshold difference between corresponding color values of content of the respective image.

19. The non-transitory computer-readable medium of claim 16, wherein the operations further comprise:
   searching subgraphs of the graph to determine whether a characteristic portion of the graph indicates malicious behavior.

20. The non-transitory computer-readable medium of claim 19, wherein the operations further comprise:
   determining a smallest subgraph of the graph that indicates the malicious behavior.

* * * * *